May 24, 1966 A. C. MAGNUS 3,252,674
MEANS AND TECHNIQUES USING MOSAICS FOR TRANSMISSION
AND OTHER PURPOSES
Filed Sept. 4, 1958 4 Sheets-Sheet 1

INVENTOR.
AGATHA C. MAGNUS
BY Lyon & Lyon
ATTORNEYS

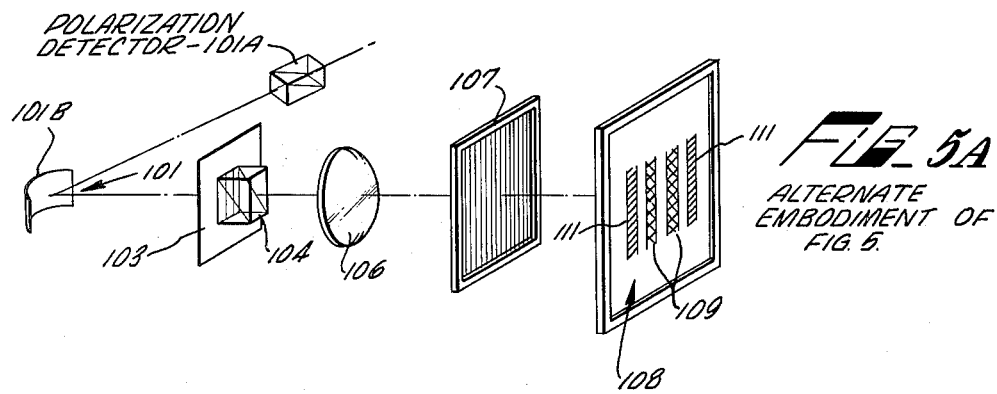
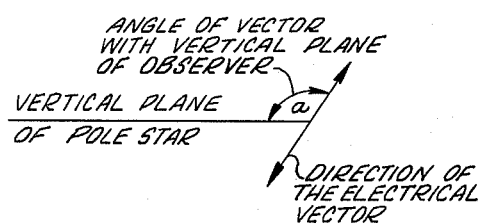
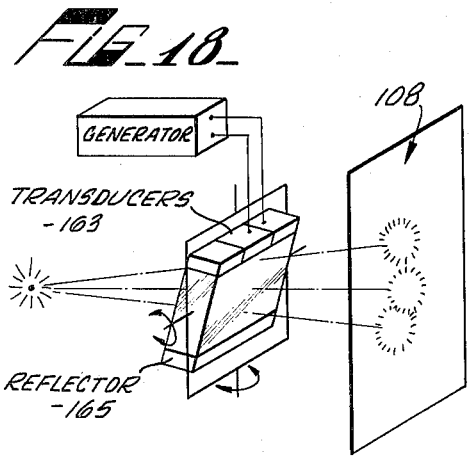
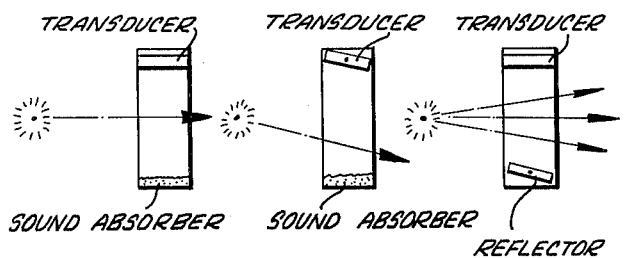
INVENTOR.
AGATHA C. MAGNUS

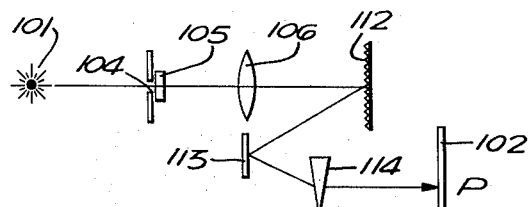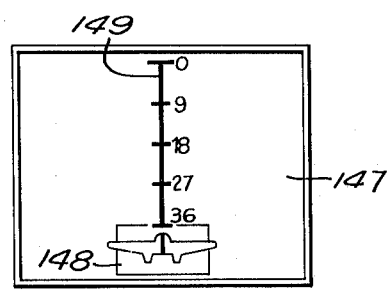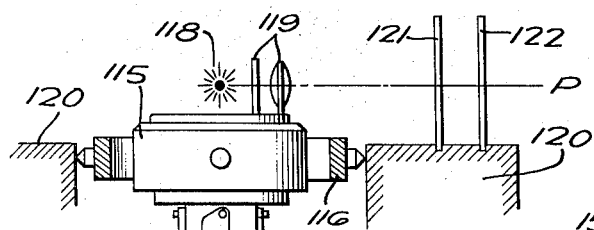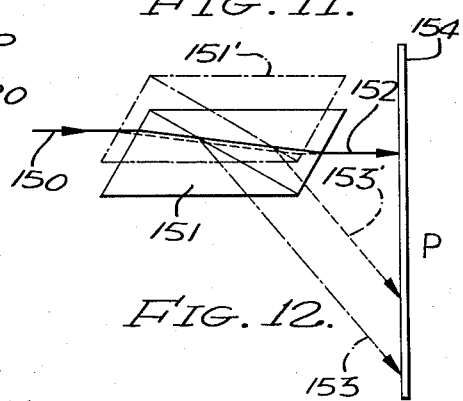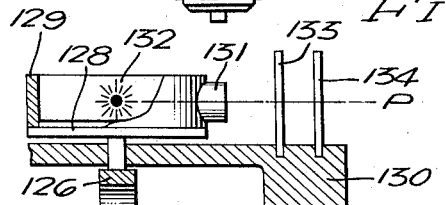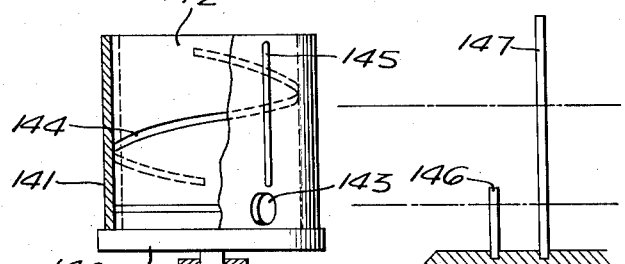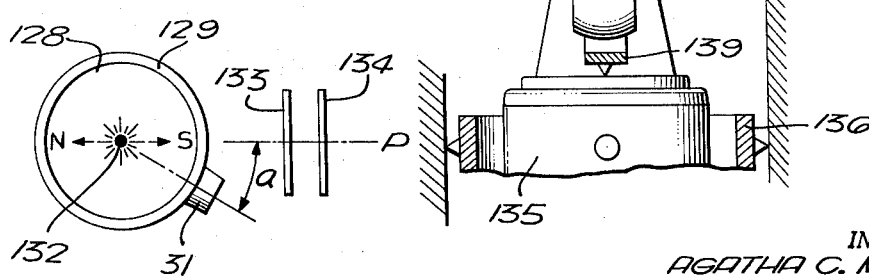

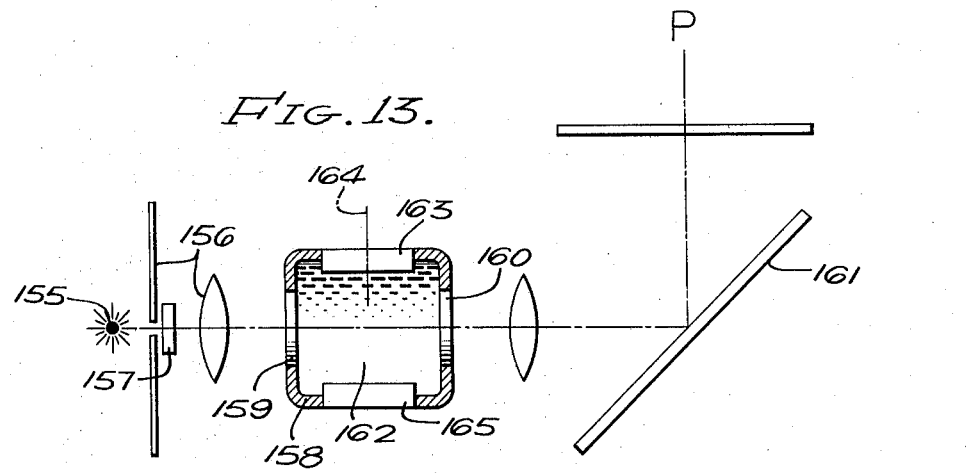
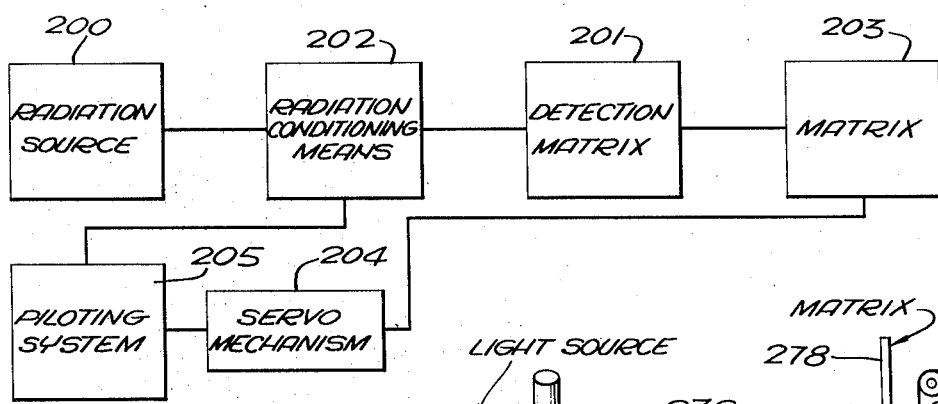
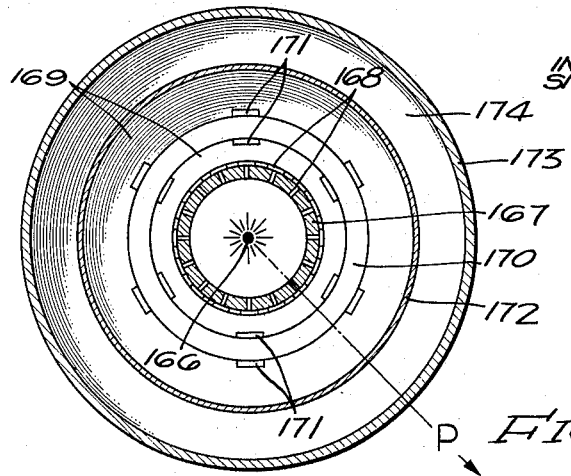
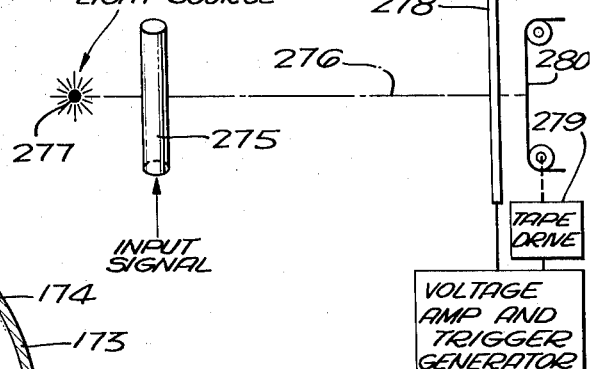

United States Patent Office 3,252,674
Patented May 24, 1966

3,252,674
MEANS AND TECHNIQUES USING MOSAICS FOR TRANSMISSION AND OTHER PURPOSES
Agatha C. Magnus, 430 La Loma Road, Pasadena, Calif.
Filed Sept. 4, 1958, Ser. No. 759,051
10 Claims. (Cl. 244—14)

The present invention relates to improved means and techniques using mosaics which is particularly adapted for transmitting information and for other purposes of the character described herein.

The arrangements described herein embody as one element thereof a mosaic of the character described in my copending application Serial No. 734,652 filed May 12, 1858, now Patent No. 3,142,561 to which reference may be had for a better understanding of the structure and mode of operation of the mosaic.

An object of the present invention is to provide transmission systems using mosaics of the character described in my above copending application.

Another object of the present invention is to provide a transmission system for transmitting information developed using mosaics of this character.

Another object of the present invention is to provide an improved guidance system wherein information developed from the mosaic is compared with pre-established information which may, for example, be presented in a printed circuit such that the aircraft or missile or submarine (vehicle) may be guided in accordance with the comparison of information derived from the mosaic on the one end and the printed circuit on the other end. The guidance system can use a diffraction pattern and the polarization of light.

Another object of the present invention is to provide an improved system in which information derived from the mosaic is used in a computer for, for example, guiding the flight of an aircraft or missile.

Another object of the present invention is to provide an improved matrix suitable for many uses and particularly as a matrix in a computer system.

Another object of the present invention is to provide an ultrahigh frequency generator with a large range of frequencies which can be chosen at will, using a mosaic of the character described in my above copending application.

Another object of the present invention is to provide an improved transmission system in which information may be transmitted from a local station to a remote station in coded or uncoded form as desired.

Another object of the present invention is to provide an improved coding system for transmitting information in coded or uncoded form.

Another object of the present invention is to provide a guidance, detection, aiming, homing, firing system using the mosaic in conjunction with a diffraction pattern, computers and servo mechanisms controlled by light reflected from the sky or from a radiation source.

Another object of the present invention is to provide an improved oscillograph system.

Another object of the present invention is to provide an improved system for telemetering information using a mosaic of the character described in my above copending application alone or in conjunction with means providing a diffraction pattern.

Another object of the present invention is to provide a facsimile printing and transmission system using a mosaic of the character described in my above copending application.

Another object of the present invention is to provide an improved detector for atomic particles and radiation.

Another object of the present invention is to provide a system whereby photographs may be transmitted taken with exposures to electromagnetic waves, atomic particles and radiation, using a mosaic of the character described in my above copending application.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 6 is a plan view of a modification of FIGURE 5.

FIGURE 7 is a view in elevation of a gyroscope using features of the present invention and functioning as an "artifical horizon."

FIGURE 8 is a view in elevation of a gyrocompass.

FIGURE 9 is a corresponding plan view with a collimator not in the same position as in FIGURE 8.

FIGURE 10 is a view in elevation of the device combining the "artificial horizon" and a gyrocompass illustrated respectively in FIGURES 7 and 8.

FIGURE 11 is an illustration of an observation screen associated with the device described in FIGURE 10.

FIGURE 12 is a modification of FIGURE 10.

FIGURE 13 illustrates a device using a fluid grating obtained by applying ultrasonic waves to a fluid medium with the characteristics of the grating being modified either by modifying the wave lengths of the ultrasonic waves or the construction of the element containing the fluid.

FIGURE 14 describes a detection and location station functioning also as a goniometric indication station in space.

Figure 1:
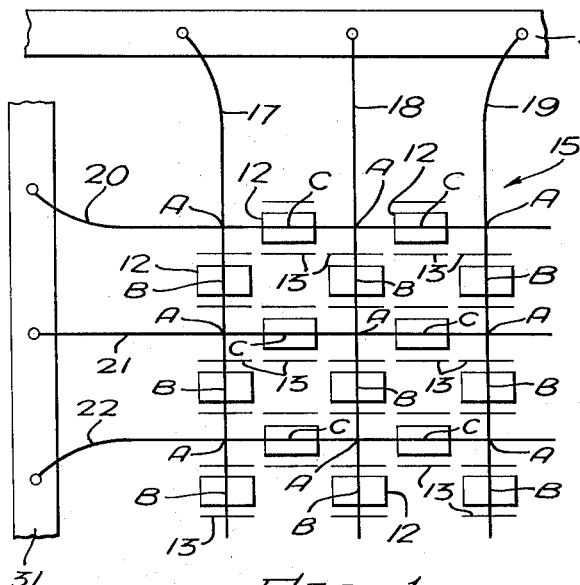
FIGURE 1 illustrates a mosaic associated with a grid network of wires and terminals for achieving features of the invention.

FIGURE 15 illustrates a servo mechanism system for illustrating the manner in which the systems described in the previous figures may be rendered automatic using the matrix illustrated in FIGURE 1 as a detector.

FIGURE 16 shows a matrix used as an oscilloscope.

FIGURE 5A shows the light source 101A, a Nicol prism and 101B an amplifying mirror (laser).

FIGURE 17 shows the orientation of the polarization plane of light from the night sky.

FIGURE 18 shows the diffraction pattern of a non convergent pencil of vibratory energy.

A mosaic as described in my above mentioned application includes generally a radiation transparent base upon which small semiconductor crystals are placed in proximity to small magnets to achieve photoelectromagnetic (PEM) effects. In such case, it has been observed that when a slab of a semiconductor is placed in a magnetic field and is illuminated in a direction at right angles to the field in the slab, a voltage is developed in the mutually perpendicular direction. The semiconductor may, for example, be germanium, indium antimonide, lead sulphide, gallium arsenate or the like. Reference is had to my above mentioned application for a more detailed description of such a mosaic and methods of making the same as well as other mosaics using photovoltaic (PV) and photomagnetic (PM) effects. While the present arrangements are described specifically with a PEM mosaic as one of the elements, the arrangements with suitable modifications may be used also with PM and PV mosaics, and thus the present invention in its broader aspects is not to be considered to be limited to the use of a PEM mosaic although a PEM mosaic is preferred.

Figure 2:
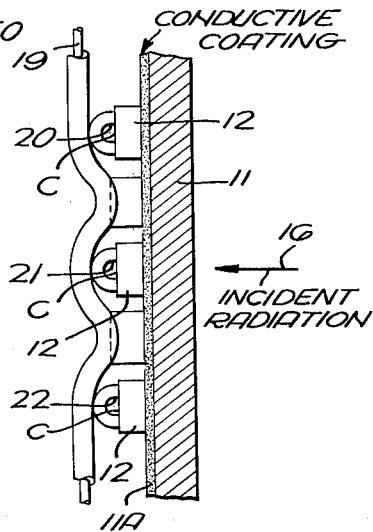
FIGURE 2 illustrates details of the arrangement shown in FIGURE 1.

The PEM mosaic shown in FIGURES 1 and 2 includes a radiation transparent base 11 of, for example, glass or quartz upon which the individual semiconductor crystals 12 and needle magnets 13 are mounted in a predetermined pattern to realize PEM effects.

The size of the crystals and magnets are exaggerated for purposes of illustration and it is understood that they are each of a size as small as practical consistent with the size of the special form of conducting mesh 15 with which they are associated.

It will be seen that the crystals 12 are in rows and that between rows of such crystals 12 there is a row of needle magnets 13, so that each crystal has a pair of magnets flanking it. The crystals themselves are preferably in the form of a cube.

These crystals 12 develop a voltage depending upon the characteristics of the incident radiation 16 such as its intensity and frequency. For purposes of using such voltages to advantage a special form of mesh 15 is associated with the crystals as, for example, in FIGURE 1.

A mosaic associated with a mesh as illustrated in FIGURE 1 serves as a matrix for many uses, for example as a target detector, memory devices, matrix pickup, light multiplier, generator, photoelectromagnetic cell, oscilloscope, transmission system, readout systems, computers, seeker heads, detectors, also for atomic particles and radiation detectors, facsimile system, map matching system, aiming, firing and ordinary or proximity fuse system.

For such purposes, the so-called E.M.F. (electromagnetic force) plane of the mosaic which corresponds to the outer surfaces of the crystals is covered with a special mesh 15 of small diameter insulated wires.

The mesh in FIGURE 1 comprises a series of vertical wires 17, 18, 19 which are spaced horizontally and a series of horizontal wires 20, 21, 22 which are spaced vertically, the spacing in each instance corresponding to the spacing of the crystals such that, as illustrated, each of the wires in the vertical series 17, 18, 19 contacts a vertical row of crystals 12 and each of the wires in the horizontal series 20, 21, 22 contacts a horizontal row of crystals 12, or several wires per crystal can be used.

For these purposes the wires of the mesh 15 are suitably insulated at their crossover points represented by the letter A but are bare at the contact points represented by the letters B and C. A similar mesh or a radiation transparent conductive layer as, for example, a half silvered surface or layer 11A can be placed on the other side of the crystals.

Various methods may be used to achieve this relationship between the mesh 15 and the crystal mosaic. For example, the wires of the mesh, prior to their assembly in a meshing pattern like that of an ordinary window screen, are covered with an insulating material. After assembly the insulation is removed at the contact points B and C so that subsequently when the mesh is placed over the mosaic electrical contact exists only at such points B and C between the wires and crystals. Another example of forming the mesh involves printing techniques heretofore developed in the "printed circuit" art in which, first, the horizontal wires are "printed" on a di-electric base in rows corresponding to the rows of crystals; second, insulation is printed over such previously printed horizontal wires; and third, the vertical wires are printed corresponding to their rows of crystals and dissolving away the insulation at contact points with the crystals. Other techniques for these purposes may involve forming a mesh of insulated wires and then subjecting the same to a solution which dissolves the exposed portions of the insulation, leaving the unexposed portions of insulation between wires intact.

Using such techniques the wire spacing may be uniform with 250 wires to the linear inch although in some cases it is preferred to increase the number of "wires" so that they exceed more than 250 to the inch.

Such wires at their ends are fringed out, as illustrated in FIGURE 1, and are embedded in or on terminal strips or boards 30, 31 of insulating material so as to provide a convenient means whereby the voltage on each wire or difference in voltage between two wires may be measured or determined as, for example, by a scanning process as described later or transmitted by wire.

The incident radiation 16 may be of any electromagnetic type or atomic type; here it is predominantly in the ultraviolet, visible portion or infrared portion of the spectrum and its intensity determines the voltage developed on any one particular crystal upon which it impinges and hence on the corresponding wire.

Various means may be provided for measuring or determining the voltage pattern developed by the incident radiation. Thus, for example, the voltage on any one particular wire may be measured in an absolute sense, i.e. with reference to a fixed voltage of zero or constant intensity or such voltage may be measured or determined in a differential sense as the voltage between different wires of the matrix.

Various means may be employed to make electrical contact with the individual wires on the terminal strips 30 and 31. For example, a wire in the form of a brush may be used or an electron beam may be used. In the latter instance the matrix is in a vacuum tube envelope and the element 11 is a wall of the envelope. Two electron guns are in the envelope for producing two electron beams, one of which makes contact with or scans the wires on terminal strip 30 and the other one of which makes contact with or scans the wires on terminal strip 31.

Figure 3:
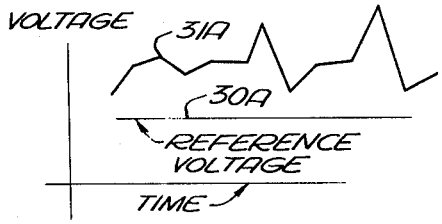
FIGURE 3 illustrates voltage variations obtained in scanning the matrix.

Using either a wire or an electron beam the voltage pattern which results from scanning one set of conductors is represented in FIGURE 3. The pattern is differential in nature in that it shows changes in voltage between adjacent wires. If the wires were all of the same potential the pattern is essentially a straight line but if there is a difference in voltage between adjacent wires there is developed a "pip" in the form of a sawtooth wave, the slope of which depends upon whether the next adjacent conductor is either higher or lower in potential.

Such voltage variation having a characteristic amplitude or intensity and slope, either positive or negative may be used in various arrangements employing well known apparatus which is sensitive to amplitude and/or rate of change of amplitude and its direction of change, to effect facsimile transmission or for other purposes.

The reference voltage 30A in some systems may be the voltage of a particular one of the wires in the series which is not being scanned while the variation 31A represents the voltages developed by scanning the other series.

Thus it is contemplated that using the voltage of conductor 20 as a reference voltage conductors represented by the series 17, 18, 19 are scanned to produce the variation 31A. After such scanning the voltage of conductor 21 is used as a reference voltage and the conductors represented by the series 17, 18 and 19 are again scanned. In this repeated process the reference voltages 30A and variation 31A are combined to recreate the voltage pattern of the matrix, i.e. the radiation intensity pattern.

Figure 4:
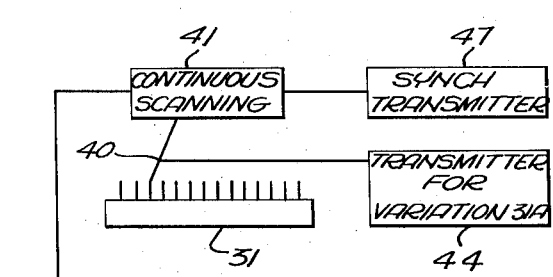
FIGURE 4 illustrates a system embodying features of the present invention.

Such a system is illustrated in FIGURE 4 for transmitting information. The terminal strip 31 is continuously scanned as, for example, by an electron beam 40 which is continuously scanned to and fro by scanning means 41 which may incorporate means for "blanking" or rendering the cathode beam ineffective during the retrace time. After each scanning period the previously stationary cathode beam 42 is automatically stepped to the next conductor or terminal strip 30 by the step-bystep scanning means 43 in accordance with a so-called synch signal developed in the scanning means 41.

Transmitter 44 transmits that voltage variation corresponding to variation 31A and transmitter 45 transmits the reference voltages represented by variation 30A. Also synch signals developed in timed relationship with movement of the beams or conductors 40 and 42 are transmitted by transmitters 47 and 48 respectively. Transmitters 44, 45, 47 and 48 may be a single transmitter which transmits a carrier wave which is modulated in accordance with the desired information as in, for example, television transmitting systems. It can also be transmitted by wire (telephone).

A similar matrix 50 is at the receiving station reconstructing the information in accordance with the variations 30A, 31A using the synch signals transmitted by transmitters 44 and 48. Such information may be reconstructed either optically for photographing purposes or electrically. The reproducing system may, for example, incorporate the photographing system described in my above mentioned copending application using a rotating drum or the drum may be rotated in step-by-step manner in accordance with the step-by-step synch signals and the light beam shown therein is modulated with a composite signal developed by combining the two voltage variations 30A and 31A, and also the crystals on the photographing drum are in the same pattern as are the contact points B and C at the transmitter. The charges created on the similar matrix mesh alone at the receiving station can reproduce the photographed picture by lifting powder off the photographic paper as described in my copending application.

It will be observed that the use of a transmitting matrix of this character may be constructed for secrecy communications. Secrecy may be further assured by varying the spacing of the vertical wires represented by the wires 17, 18 and 19 by providing non-uniform spacing or by omitting certain wires in an otherwise uniform pattern. In such cases the duration of the individual pulses in the variation 31A are not of the same duration (assuming a uniform sweep of the cathode beam). A similar "mesh system" is required at the receiver.

The particular configuration of the mesh may be changed periodically for preservation of secrecy.

Also the particular configuration of the mesh may be of a particular pattern when the matrix is used as an element of an analogue computer or to transmit a certain sequence of information as in a telephone system. As only a station with a similar mesh can receive a message or picture transmitted by these means, numerous stations can be served by one central station with an unlimited number of transmission mesh types, so that a vast and private communication system with an unlimited number of stations can be established. It would become an individualized communication system analogous to the present telephone numbers.

When the matrix is used as a guidance element for translating diffraction pattern information to servo mechanisms, the guidance pattern is projected onto a coating of crystals under which is the same type window screen mesh. The mesh acts as matrix of a computer in contact with the servo mechanisms or is in contact with a printed set of circuits to the servo mechanisms.

Thus, another aspect of the present invention involves the use of a matrix of this character in an arrangement for controlling the orientation and position in space as well as gauging the goniometric measurements of the position in space of objects such as vehicles, arms and scientific instruments.

The word "vehicle" is interpreted as meaning any means of terrestrial, aquatic or aerial transport, with or without a pilot, which means that the process according to the present invention can be applied to piloting with or without visibility, to entirely automatic piloting, or to piloting controlled from a distance of aircraft, tanks, ships, torpedoes, etc. and to the detection of such vehicles and the automatic measurement of their position in space.

The term "arms" is understood to stand for such heavy arms as projectiles, the arrangement being applicable to maintaining or modifying automatically or semi-automatically the line or trajectory of their firing, as well as for the automatic or semi-automatic aiming, fusing and dropping of bombs from aboard a vehicle, the exact operating position of which can be calculated and ascertained in advance, or to automatic firing on a moving target.

The arrangement is also applicable to determining in space the sighting of scientific instruments such as telescopes, cameras and geodetic instruments.

It is known that when a pencil of light falls on a diffraction grating, that is a series of very narrow parallel slits separated by equally spaced dark intervals, these being obtained, for example, by ruling a glassplate with fine parallel lines, or with lines engraved parallelly according to rectangular axes, by a series of glass plates, a frame on which parallel and crossed parallel threads are stretched, or by a medium under the influence of ultrasonic pulsations, or by a colloid suspension of ferromagnetic particles in a magnetic field, or a step grating or electron grating, the phenomenon of diffraction is obtained.

The pencil can be projected either by a slit or by a surface perforated by many pinpoint holes preferably evenly distributed on its surface. When monochromatic light is used the phenomenon produces behind the diffraction grating a series of light parallel images of the slit called fringes which are separated by dark intervals, that is dark diffraction fringes.

When white light is used a similar phenomenon is produced, but the fringes or patches of light are transformed into spectra with their violet bands towards the central image.

On each side, respectively all around, this central white image there will be thus a spectrum termed of the first order, then a second spectrum termed of the second order, and so on, the red zone being towards the outside with reference to the symmetrical axis of the obtained image.

Normally the first order spectra will be the most intense, those of the second order will be less intense, and so on, but it is also possible to create diffraction gratings which concentrate the intensity of the light on certain predetermined orders of spectra.

When the diffraction grating is constituted by ultrasonic waves pulsating through a medium, any one of the different orders of the resulting spectra may be intensified at the expense of the other orders, by modifying the angle of incidence of the pencil, or by modifying the width of the fluid band submitted to ultrasonic pulsations which is traversed by the pencil of light, or by modifying the intensity or amplitude of the ultrasonic energy pulsating through the medium creating the grating, or by variations of the relation existing between the wavelengths of the ultrasonic waves creating the diffraction grating and the wavelengths of the light used for emitting the pencil projected through the grating adopted, or, lastly, by using either stationary or progessing ultrasonic waves.

Another distribution of the diffraction fringes or spots, or a modification of these latter is also obtained by combining several gratings and modifying their respective positions. These modifications are caused by interference phenomena.

The image of diffraction obtained is normally symmetrical, if all the elements under consideration are exactly in line, if there is for example, exact parallelism between an emitting slit and the slits of a parallel grating and if the planes of this latter and of the screen on which appear the fringes are perpendicular to the axis of the whole distribution. The diffraction image is modified as soon as one of the conditions essential to its formation no longer exists.

All these phenomena can be produced by any vibrant energy such as, for example, electromagnetic fluxes, short and ultrashort wireless waves. Thus, a combination of elements may be used comprising at least one source of vibratory energy, of which at least one pencil of rays is used, together with at least one diffraction grating capable of diffracting a pencil of vibratory energy as well as means of observing the phenomenon of diffraction obtained by the combination. Any one of these elements can be connected with at least one organ of orientation and detection. The observation of any of the phenomena described above allows detection of the slightest change of direction of any of the constituent parts of the whole combination.

Any organ controlling an object to be directed in space, for example a rudder or a sighting mechanism, is here termed an "organ of orientation." This term also stands for any organ used for determining a direction, for example a compass, it also stands for any sighting organ or again any organ detecting a direction, or finally for any organ combined with an orientation mechanism, such as organs constantly orientating a mobile object towards a target to be aimed at or followed or, on the contrary, directing an object away from an obstacle.

The devices for applying this process may consist of the combination of the elements enumerated above and of which at least one part will be connected with at least one organ of orientation. The means of observing the phenomenon of diffraction may also be provided.

When the direction of a vehicle is entrusted to a pilot, it is this latter who will be required to observe the variations produced in the image of diffraction, as well as with deducting from them the changes of the state of one or of a group of organs controlling the vehicle, and with the corrections eventually to be made. By analogy, the above applies to anyone in charge of an arm, to the observer of an instrument of detection and location or to the user of a scientific instrument.

In the case of purely automatic control, the observation is entrusted to organs sensitive to the modifications of the image of diffraction such as, for example, photoelectric cells in the case of visible, infrared or ultraviolet images, or such as electronic counters in the case of wireless waves, the mosaic being associated, for automatic control purposes, with a computer or printed circuit as explained later. These organs in their turn convey to the controls all impulses required for carrying out the operations demanded by the observed changes of state, either when the act positively or negatively, that is to say, come into action under the influence of a maximum or minimum of registered energy.

Adapted to aviation the process of the present invention and the devices according to the present invention will permit, for example, flight without visibility by furnishing indications and control of the position of the horizon, of the azimuth direction of the course, or again of the inclination to be maintained when not flying horizontally.

Acting as a detector, they also make it possible to pursue any material target, just as they will make it possible, for example, to control aircraft by a wireless station, either to bring it into land or to send it away in a given direction.

In the case of firing, they will make it possible to obtain similar results: maintaining of a given direction and angle of aim, aiming at a material mobile target, direction and angle of aim controlled from a distance by any emitting station.

Control by an emitting station from a distance is effected preferably by means of ultrashort radio waves, the use of which, in combination with means for the automatic observation of the diffraction fringes, or of the interference fringes, make it possible to create "robots" in all fields where an orientation in space must be imposed on a fixed or mobile object, on arms, terrestrial, aquatic or aerial vehicles, on cannons, tanks, torpedoes, or submarines, aeroplanes or rockets and missiles, for example.

By polarizing the vibrations in the case of gratings with parallel slits and of pencils likewise projected by a slit, so that the plane of polarization is parallel to the direction of the slits of the grating, it is possible to obtain a much clearer and more intense image of the diffraction fringes, the emitting slit may thus be considerably enlarged. Besides, the distortions in the image of the fringes appear more rapidly and more visibly if polarized vibrations are used, as soon as there is any modification of the symmetry of the disposition of any of the elements of the devices.

On the other hand, polarization requires the adoption of means such as, for example, a birefringent prism, if light is used, or of a magnetic field, if wireless waves are used. A prism of this kind also makes it possible to direct a pencil of rays in a given plane of polarization, thus giving it a horizontal or inclined fore and aft direction, if the plane is vertical.

Figure 5:
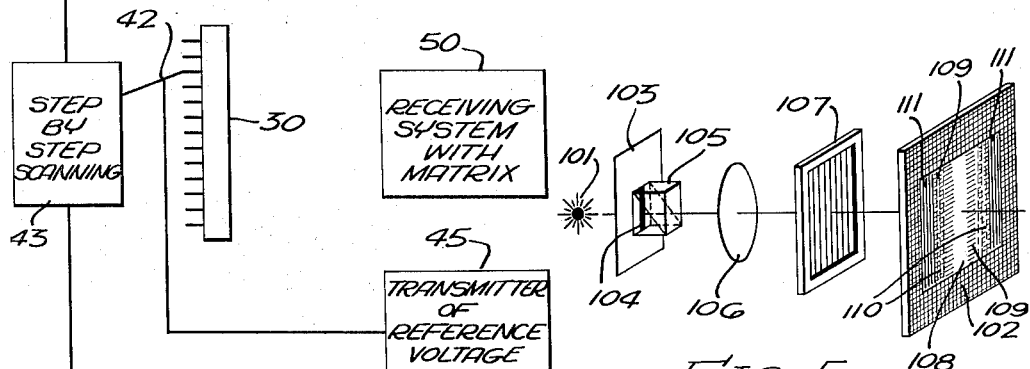
FIGURE 5 is a view in perspective serving to illustrate another system embodying the present invention.

In FIGURE 5, diffraction pattern fringes are produced by a vibratory source 101 on screen 102, which is preferably a matrix which has been described previously.

So as to produce these fringes an opaque screen 103 furnished with a slit 104 and means of polarization 105 and a lens 106, acting as a collimator together with slit 104 and a grating 107, are interposed between the source of energy and the observation screen.

All these elements are placed on a common axis (dot and dash line), the screen and the diffraction grating are at right angles to it and the polarization plane is parallel (in the drawing vertical) to the direction of the grating's slits.

If the source of energy 101 is emitting white light, the screen 102 shows a vertical central fringe 108, which is practically white, bordered on each side by other spectra, those of the first order alone being shown here, they are indicated by cross hatched bands symbolizing those of their fringes which correspond to the basic colors, that is blue in 109 on the inside, then yellow in 110 and lastly red in 111 on the outside. The rest of the screen is dark, that is black; in reality, however, the two spectra of the second, third and $n$th orders, normally of decreasing intensity, unless means are provided for accentuating the spectra of a given order at the expense of others (for example, by use of accessory progressing ultrasonic waves, by modifying such waves which already normally are part of the device, by inserting an absorbing screen, etc.).

Screen 102 may be observed by a pilot, to whom any variations in the colored image will indicate the displacement of one of the elements 104, 106, 107 which are normally in line with the screen, or the information may be transmitted remotely in the manner previously described. The variations will also indicate the displacement of a diffracting organ interfering with the grating 107, when this method is applied, or they will indicate any modification of one of the factors of the system, for example the characteristics of the grating, should these latter be modified (in the case of ultrasonic gratings modified by any means or modulated by wireless waves).

Instead of transparent gratings it is quite obvious that at least one reflecting grating could be used. This is shown in the plan of FIGURE 6 where the source of light 101, the screen 102 and the collimator 104, 106 again appear.

Here the grating consists of a reflecting surface 112, ruled vertically, that is perpendicularly to the plane of the design. The diffraction pattern fringes can therefore no longer be observed by transparency, a mirror 113 and a prism 114 are therefore provided so as to reflect the image on the panel board observation screen 102. The prism 114 is required for righting the diffraction pattern which becomes distorted by the asymmetrical arrangement of the supplementary elements 113 and 114.

It is clear that one could also eliminate the collimator and replace it, for example, by a simple convergent lens. Then the grating needs only be placed in the focal plane of said lens.

A curved concave reflecting grating could also be considered, its axis of revolution would be perpendicular to the slit-grating plane or to the plane of polarization. Such a grating would eliminate the use of the means of collimation. It would make it possible, besides, more easily to give an inclination to the pencil emitted by the slit, by inclining the prism in the manner indicated above, or to produce modfications in the state of the whole by inclining the grating itself.

The principles described in connection with FIGURE 5 are applied to a gyroscope functioning as an "artificial horizon" in the arrangement shown in FIGURE 7.

The spinning top case 115 and its suspension ring 116 are shown. The spinning top is kept in movement pneumatically, its case is furnished with shutters 117 connected with a distributor at its lower end, these are designed to re-establish equilibrium should it be momentarily disturbed. Normally, therefore, the axis of the gyroscope will occupy a vertical position and the upper surface of case 115 a horizontal position.

It is understood that the radiation source 101 may be the light from the sky which is itself polarized. It is filtered by a Nicol prism and thus acts as a guidance element. Because the electric vector of sky light, even at night, is at right angles to a plane passing through the preselected reference center of the system, such as the pole star, the sun and the observer, an independent guidance element is provided which cannot be interfered with over large areas. A possibly changing polarization can be filtered out by appropriate means and followed in a predetermined course, if required, or used as a reference (see FIG. 17).

Thus, to constitute an entirely self-contained guidance system that cannot be interfered with, the source of vibratory energy will be prechosen and taken from the sky in a prechosen polarization plane. As the electric light vector is perpendicular to a plane through the center of the universe, the sun and the beholder and the light is approximately 17% polarized when reflected by the sky, this is a surer way of guidance than the inertial system. Ultraviolet light which is also polarized can also be used.

On this surface 115 a source of vibratory energy and the combination consisting of screen-lens constituting the collimator 119 with polarized pencils, are fixed. The axis of the pencil emitted by this system will be maintained horizontal independently of any pitching or rolling movement to which the pediment 120 may be subjected.

This pediment supports the grating 121 and the observation screen 122. When the vehicle carrying it is in a horizontal plane relative to some pre-established reference, the elements (light-collimator) supported by the case of the spinning top and those elements (diffraction grating, observation screen) supported by the base, are all in line and the pilot may observe on his screen 122 a symmetrical diffraction pattern which from now on will be termed an "image of equilibrium" of the diffraction fringes. Such an image is therefore an indication that the attitude of the vehicle is correct relative to the predesignated reference.

Whatever the nature of any displacement operated by said vehicle from the reference attitude defined above, the displacement will become apparent on the screen 122 by a modification of the image, if the vehicle dips, that is takes a downward direction, the diffraction pattern observed by the pilot would seem to sink on the screen; on the other hand, if the vehicle climbs, the opposite effect results, or again if it swerves from a straight line or banks the parallelism between the polarization plane and the direction of the slits of the grating will be disturbed and the image of the diffraction fringes broken up.

It must be noted that any modification of the distribution of the fringes is immediately apparent, long before the eye can detect clearly any lack of coincidence between the bar generally constituting the known artificial horizons with their indicator lines as used in gyroscopes of current construction.

The disposition of the source of light and of the slit fixed on to the mobile fittings and of the grating and the screen fixed to the immovable elements or incorporated with the vehicle itself, which has been adopted in this example, is obviously arbitrary. One could, for example, just as well adopt a fixed source of vibratory energy and a fixed observation screen between which a mobile grating could be displaced, it is understood that this alternative applies also to all following examples.

FIGURE 8 shows another application in the case of gyrocompass, which can also be adapted to gyromagnetic compasses, that is gyroscopes in which the correction of the position of the spinning top is effected by magnetic means.

The spinning top 123 the axis of which 124 is designed to remain in the plane of the local meridian is suspended by the rings 125, 126 of a cardan hook.

The ring 126 supports the graduated rose 127 of a usual compass and, on its upper part supports a rotating platform 128, surmounted by a ring 129. The whole is fixed onto a pediment 130 incorporated with the vehicle.

The ring 129 can be angularly displaced in regard to the platform 128, around which it turns in sliding fit. It supports the collimator 131, while the source of energy 132 is placed in its center.

Let us assume that the axis source of energy collimator normally occupies the north-south position, in which it corresponds to the common axis of the grating 133, the screen 134 and the vehicle (fore and aft axis). The pilot observes 134 which may be a matrix as previously described for transmitting the information to a remote point or to a computer and servo mechanisms.

In this position of the elements under consideration an image of equilibrium of the diffraction fringes indicates a course exactly following the south-north direction. Any deviation from this direction immediately becomes apparent by a modification of the above image.

If now the vehicle is to follow another course which, for example, is at an angle $a$ to the east, the ring 129 need only be displaced with its collimator 131 by an angle $a$ in that direction with regard to the platform 128. The position thus obtained is shown in plan view in FIGURE 9.

So as to re-establish an image of equilibrium of the fringes, which are no longer projected on to screen 134, the pilot will have to turn the vehicle by such an angle that the axis of the collimator and the fore and aft axis of the vehicle, which at present diverge by the angle $a$, again coincide. The precision of this coincidence can be easily verified by observing the image of the diffraction fringes on the screen. The turn can be effected by computers connected to the screen matrix and the servo mechanisms.

The device shown by FIGURE 10 shows a combination of an artificial horizon with an azimuth indicator of the course.

It consists of two spinning tops, one of which indicates the horizon, while the other constitutes a gyroscopic or gyromagnetic compass.

The first of these spinning tops is contained in case 135 supported by the ring of the cardan hook 136. It supports again the second spinning top 137 and its rings 138 and 139, constituting the compass. The axis of ring 139 will therefore always remain vertical to the predetermined reference and the platform 140 with which it is incorporated will always be horizontal to this reference. The axis of the spinning top 138, on the other hand, will always remain in the local meridian plane thus fixing angularly the position of platform 140.

On this platform an exterior cylinder 141 turns in sliding fit around an interior cylinder 142 incorporated with the platform.

In the interior, in the axis common to both cylinders are placed one or several sources of vibrating energy. They can be of elongated tubular shape and will simultaneously project toward the exterior two luminous pencils: one through a lower circular slit of the interior cylinder 142 and the collimator 143 which is fixed to the outer cylinder 141, the other by the helicoidal slit 144 of the interior cylinder and the vertical slit 145 in line with the collimator 143 cut into the exterior cylinder 141 of collimator 143 in the exterior cylinder.

The pencil emitted by the collimator will always remain within the same horizontal plane and constitute the artificial horizon while the pencil which can pass through slits 144 and 145 will occupy a position the height of which will indicate the relative angular position of platform 140 in relation to cylinder 141.

The first of these pencils passing through the grating 146 will normally strike the base of the screen 147, where it will create a diffraction pattern and fulfill the function described in relation to FIGURES 8 and 9, that is making it possible for the pilot to keep on a straight and level course of a given azimuth.

The pencil emitted by the slits 144 and 145 will not pass through the grating but will imprint a spot of light on the screen, the height of which will allow an angular reading of the azimuth, thus replacing the graduated rose.

This application of the principle according to the present invention could just as well utilize a mobile grating together with a compass, or replace the two optical systems by an ultrasonic grating of stationary waves together with an optical grating which will produce black interference fringes, the spacing of which will indicate the azimuth (course).

FIGURE 11 shows the screen 147 seen from the front as observed by the pilot.

In a lower frame 148 on which may be drawn the aircraft silhouette in general used in an artificial horizon, the diffraction fringes will appear, while the spot of light indicating the azimuth will rise or sink, along the scale 149 which is graduated from 0° to 360° according to the course chosen, the silhouette of a plane can be, moreover, colored so as to merge completely with the image of equilibrium, thus making the slightest variation all the more apparent.

If the pilot is in the position P of FIGURE 9, there will be no fringes on the screen, but he will be able to ascertain the direction of the turn he must give his vehicle so as to bring the "azimuth light spot" on to scale 149, next to which it will be placed, then perfect his direction by only observing frame 148.

As the upper surface of the device 140, 141, 142 could contain a magnetic needle and a rose, these could be projected on to the screen where the pilot could observe them simultaneously with the other indications. It is well understood, besides, that in this example, as in that of FIGURE 8, the rotation of ring 129, respectively of cylinder 141, could be effected by control from a distance either electrically, hydraulically or mechanically, or by a control which would be easily accessible to the pilot and which would not interfere with one or several gyroscopes. The rotation could be effected, too, from a distance but without the intervention of the pilot, for instance by means controlled by electromagnetic ultrashort waves.

If the grating, on the contrary, were mounted on the gyrocompass the azimuth would be indicated by the rotation of the grating.

In the first case the turning cylinder could be directly connected with a directional aerial or supported by it and turned with it, while in the second, the aerial would directly control the grating itself. In this case, too, the direct reading of the azimuth could be obtained by measuring the black interference fringes.

The screen of FIGURE 11 can obviously be fitted with photoelectric cells or electronic counters which would register automatically all the observations normally effected by the pilot and effect themselves automatically or semi-automatically all required operations. Preferably the above described matrix is connected to a computer or printed circuits and to the servo mechanisms.

Such cells or electronic counters fitted, for example, along the scale 149 would control the position of the rudder.

Another means of combining the artificial horizon with the azimuth is indicated in FIGURE 12.

As the polarization of the incident luminous pencil 150 is supposedly effected by means of a birefringent prism 151, an extraordinary ray 152 is obtained and utilized so as to control the horizon, another ray 153 called the ordinary ray could also be projected on to the screen 154 behind which the pilot is placed.

By translating the prism in the polarization plane and in a direction at right angles to the incident pencil so as to bring it to 151', nothing is changed as regards the position of the extraordinary pencil 152, but the ordinary pencil now is brought to 153'. The displacement of the prism must, of course, remain within the limits of its depth.

If we assume this translation to be effected as a function of the azimuth, the displacements of the light spot formed on the screen by the ordinary ray 153 will give azimuth readings, which need only be read from a properly graduated scale.

All examples so far described utilize pencils polarized in a normally vertical plane or a slit in the same direction, this creates a spectrum with vertical fringes, but nothing stands in the way of placing the plane of polarization and the slit in different directions, for example horizontally, or of distributing differently the elements to be fixed or those, on the contrary, which are to remain mobile.

In this example, as well as quite generally, in all devices applying the process according to the present invention, the use of photoelectric cells is possible, obviating also the necessity of using visible light, because such cells make it possible to conceive devices with infrared or ultraviolet sources of energy as well as wireless waves, preferably the matrix as described previously.

So as to insure greater security such photoelectric cells will be fitted preferably in pairs but independently from one another, so that a defective cell of one pair could immediately be replaced by the other cell of the same pair.

An automatic piloting device could, after amplification, bring the current from the cell to act on valves acting as servo motors connecting each cell to the organ of direction of the vehicle placed under its control.

The use of such cells presents no difficulty whatsoever, the material from which they are made need only be chosen in such a manner that they become as sensitive as possible, not only to the intensity but also to the quality of polarization and frequency of the energy they receive.

The devices of FIGURES 7, 8 and 10 make it possible to pilot with great precision horizontally, but not to maintain a given angle of dipping or climbing. A dip or a climb displaces the image of the fringes and makes them irregular but not in such a way as to enable the pilot to maintain a constant distribution of the fringes.

But if, for example, a birefringent prism is utilized, it is easily inclined, together with the collimator, thus displacing the artificial horizon either up or down. By thus lowering the prism by 30 degrees, the pilot will be obliged to dip by an equal angle, if he wants to again obtain an image of equilibrium on the screen, this image will further oblige him to maintain said inclination as long as the prism remains inclined by chosen angle.

This inclination of the prism, or more generally, of the pencil of vibratory energy, can be effected equally by all automatic, semi-automatic or non-automatic means directly or from a distance.

A means of influencing all or some of the photoelectric cells exposed to the action of radiations from devices applying the present process could consist in inserting momentarily one or several absorbing screens in the path of said radiations. This would, for instance, make it possible to annul the action of certain radiations or, on the contrary, give them preponderant influence.

Here again the displacement of such a screen can be effected by all possible direct or indirect means.

Thus, in a robot system the state of equilibrium may be modified by inserting an absorbant screen thus giving predominant activity to certain chosen radiations with the object of prescribing to the vehicle a given circuit, either in a straight line or not in a straight line. The latter effect could be obtained by causing a sequence of screens of different absorbing properties to follow one another, each designed to control the successive pilotage operations. Each sequence of screens could perhaps be a film with different zones which under control of a clock-work would be inserted progressively or unrolled by other means, and would oblige the robot to execute any manoeuvers in a given time sequence. The same clock-work could cause the energy source to choose another polarization vector of the sky. This would alter the course.

A device carrying out the process according to the present invention could equally be conceived which would guide a pilot in all operations of homing or landing or taking off, or start these operations automatically or semi-automatically.

A device such as the one described in FIGURE 13 could be utilized for the above operations. FIGURE 13 illustrates the application of ultrasonic waves constituting a diffraction grating with variable characteristics.

The source of vibratory energy 155 which transmits a directed pencil through the collimator 156 and a polarizing organ 157, projects the pencil through a hermetically sealed container 158 with transparent walls 159 and 160, through which the polarized pencil reaches the mirror 161.

The fluid 162 in the container could be distilled water, xylol or a gas, or compressed or non-compressed air. One of the container's sides is partially occupied by an ultrasonic generator 163, for example a piezo-quartz, both faces of which, which are at right angles to its piezo-electric axis 164, are covered by a metallic conductive layer to which is applied an electric tension, the frequency of which corresponds to the quartz's frequency of oscillation. These oscillations, that is to say the dilations and contractions of the quartz, will be transmitted to the fluid 162 and it is known that under such conditions the fluid will act as a diffraction grating on the vibratory rays passing through it.

According to the material out of which the plate 165, which is situated opposite to the piezo-quartz, is made, progressing waves (if the plate is, for example, in cork) or stationary ultrasonic waves (if the plate is a polished plate of glass) will be obtained.

This plate could be made interchangeable at will, either by direct action by the pilot, or again by action from a distance.

Obviously the screen which will be placed in the pencil reflected from the mirror 161 in direction of the pilot P, will show, as in the other examples, diffraction images, the observation of which will make it possible to draw various conclusions regarding the respective elements producing the diffraction fringes.

The source of vibratory energy and the screen, for example, could be fixed to the vehicle and the hermetic container and the collimator mounted on a gyroscope or gyroscopic compass.

The fact of placing a mirror inclined at 45 degrees on the axis of the device makes it possible to reflect the diffraction images towards the pilot at right angle. An additional inclination of the mirror could compensate the speed of a moving target, if the device is used as a sighting or detecting device.

The advantage of utilizing ultrasonic waves consists in the possibility of modulating them as well as of modulating by them, ultrashort wireless waves. Although every quartz is in principle tuned to a given frequency, it is possible to cause it to vibrate with other frequencies. This results in the possession of a grating with characteristics variable at will and controlled by a source of energy consisting of ultrashort wireless waves modulated by ultrasonic waves. The ultrasonic waves can be reseparated from the ultrashort wireless waves, just as at present normal sound waves are separated from the wireless waves which they modulate.

The quartz can be excited by a single given station and be tuned to this station by intervention of the pilot or automatically, however distant that station may be, and indicate the station's azimuth, thus serving as a goniometrical device controlled by said station.

As the characteristics of the diffraction fringes depend on the wavelength of the ultrasonic waves through which the pencil of vibratory energy passes, the pilot will be able to recognize any emitting station, provided that each station sends out ultrasonic waves of different wavelengths or radio-electric waves modulated by ultrasonic waves of different wavelengths. The distance of the emitting station can be accurately gauged by employing techniques known to the art as phase sensitive devices which in actuality are utilizing the instantaneous per cycle intensity of the ultrasonic wave, of the radiation and its modulation envelope relative to a time reference. Various artifices thus can be utilized to reference such intensity/time relationship with the speed of propagation so as to minimize dependence on the natural laws of attenuation in the medium through which radiation is being propagated.

At a considerable distance, wireless waves modulated by ultrasonic waves will be employed and transmit said modulations from the emitting station to the quartz of the receiving device.

As the degree of intensity of the different orders of the diffraction images produced by progressing ultrasonic waves is distinctly different from the degree of intensity obtained with stationary waves, the fringes of the images obtained will equally serve to indicate the presence of a detected object, that is, an object placed in the ultrasonic wave path or in that of the wireless waves modulated by ultrasonic waves. Such waves reflected by any obstacle will produce in the hermetic container the effect of stationary waves, a near or distant object could thus be detected and located either by using directly ultrasonic waves or by using radio waves modulated by ultrasonic waves. The amplification required to obtain standing waves gauges the distance of the detected object.

By inserting, on the other hand, an optical grating together with an ultrasonic grating in the path of a pencil of vibratory energy, it will be even easier to detect the presence of reflected waves of whatsoever nature they may be, because only stationary waves can produce black interference fringes; when used together with an optical grating, progressing waves cannot produce these fringes. Therefore the appearance of such black fringes will be a certain indication of the presence of an object placed in the path of the waves and will make it possible, for example, by using, as previously described, photo-electric cells or the matrix, to direct a vehicle automatically or non-automatically, either by detection from the ground or from a target. This target can be followed and be mobile itself and can be pursued inexorably and with all necessary precision by an automat fitted with an ultrasonic pilot and photo-electric cells or the matrix described previously. The said target can obviously also be a gun target and the device used for pointing a gun, directing a tank, a missile, a torpedo, etc., or triggering a fuse.

The device of FIGURE 14 is particularly adapted to all uses in correlation with location and detection and consists of an ultrasonic emitting station, or a wireless station emitting ultrashort wireless waves modulated by ultrasonic waves, the emissions of which are radiated in all directions of space and thus make detection and location in all directions of space possible.

In the center of the device is placed the source of light 166 projecting a multitude of pencils of light radially and in all directions through the wall of a sphere 167 perforated by a great number of holes or slits.

In the opening of the holes or slits of the sphere 167 piezo-quartzes 168 are inserted.

Immediately around the cylinder 167 is a hollow sphere 169 figuring the hermetic container of the fluid grating which a ring-shaped piezo-quartz 170 situated inside the container submits to ultrasonic waves. This piezo-quartz is excited by interior and exterior electrodes 171 equally distributed around its perimeter.

The exterior wall 172 of the hermetic container serves finally to prevent reflections, while around it spreads the observation matrix screen 173 by the help of which are made or registered all observations.

The remaining annular space 174 constitutes a second grating connected, for example, with an aerial or an indicator of the magnetic north, for instance a homogeneous magnetic field influencing ferromagnetic particles suspended in a solution. This second grating helps to situate the emitting stations' position in regard to the magnetic north.

The spherical screen, a modified matrix, can be graduated into degrees and make it possible to detect and locate objects in all the surrounding space, their movements, their eventual guidance and position.

By fitting the central sphere 167 with small shutters permitting the obstruction at will of any desired region, this embodiment can become an emitter radiating into a given zone which is to be explored.

As the sphere can be electrically excited, it acts as an emitting aerial in all directions of space pencils of wireless waves modulated by ultrasonic waves, with each pencil hemmed in by the ultrasonic waves emitted by the piezo-quartzes which are inserted into the holes or slits of the sphere.

The dash and dot line shows one pencil observed in P and indicating on the observation screen any object approaching in the line of said pencil.

Instruments applying this procedure could also be equipped with a source of light emitting a pencil of light which does not converge. In this case only one light blotch appears on the screen, if the incident pencil is parallel to the wave front of the ultrasonic waves through which it passes. Should any other angle of incidence occur, then the pencil of non-convergent light would be divided into several pencils by passing through the band of ultrasonic waves and then several blotches appear on the screen and at other place of the screen from the place on which the parallel pencil throws its blotch. Thus the angle of incidence is indicated to the pilot or to the photo-electric cells or matrix connected with a computer which can replace him.

As the intensity of the fringes produced depends on the angle of incidence of the reception, the devices embodied in FIGURES 13 and 14 can by themselves and with a single emitting station serve for goniometric purposes replacing radio goniometric devices. In this case the observation screen would consist of a spherical assembly of either photo-electric cells or of electronic counters or of the matrix and computer described previously.

This same object could also be obtained by combining two gratings, for example an optical grating and a stationary ultrasonic grating or two optical gratings.

The position of one of these gratings is kept in rigid relation to the magnetic north and the other connected to organs detecting or locating a given target (azimuth or material target), then the distance between the black interference fringes produced by this system gives a reading of the angle between the two above mentioned directions, for example the degree of a compass.

This principle can, of course, be applied just as well to wireless station emitting only wireless waves modulated by ultrasonic waves.

This stands to mean that, should the emissions which are intended to excite the quartz be of a radio-electric nature, then their diffraction could be obtained through the means of a magnetic diffraction grating, and their observation made possible by a screen constituted by photo-electric cells or electronic counters or the matrix and computer as described above.

It is superfluous to repeat here that everywhere where fringes are mentioned spots could just as well be described, according to whether the luminous pencil is emitted by a slit or a multitude of pin-point holes.

In the case of equipment controlled by electromagnetic waves the process is the same, part of the elements producing diffraction spots or fringes being placed under the control of an appropriate radio-telephonic installation and direct observation carried out by a pilot or, for example, by the matrix previously described, a computer or printed circuits.

Ultra-short waves make it possible to obtain without difficulty a tuning warranting perfect selection from a series of wave-frequencies very close to one another, that is occupying a very narrow wave-band, of which one wave-frequency reserved exclusively to one vehicle or to one group of vehicles.

So as to direct a group of vehicles or apparatus, wavebands obtained by diffraction could be used, each diffraction fringe of which would be reserved for the control of a given vehicle or of devices fitted with differently absorbing screens. Each vehicle or apparatus thus receives the directing emission and diffracts it in its turn, so as to extract from it the elements required for its own direction. Thus order can be transmitted to a group of elements, or respectively concerted but not identical movements by means of a single emitting station and by a single emission from it, which is diffracted by a diffraction grating.

Also the spectra of the fringes may be used for transmitting signals either by special instruments or by those used for piloting. Likewise, distinct radio-telephonic numbers can be obtained by diffracting or rediffracting the single emission from a single station.

It is understood that in those systems described above wherein radiation impinges on a screen, that such features according to the present invention is a matrix as described herein and that the voltages developed from said matrix are compared with other voltages so as to obtain a resultant voltage which is applied to effect an automatic control function in a servo system.

Such a servo system is illustrated in FIGURE 15 wherein the light or radiation source is represented at 200 and the radiation therefrom impinges on a detector matrix 201 of the construction shown in FIGURE 1 after being conditioned for polarization and/or production of diffraction patterns by the radiation conditioning means 202 of the character described above.

The voltages developed by such detector matrix 201 are compared with voltages developed from a similar matrix 203 to produce a similar voltage which is applied to the servo mechanism 204 for changing the radiation conditioning means 202 and effecting adjustment of, for example, the aircraft piloting controls 205 to restore the composite system to a balanced condition, i.e. to a condition wherein the resultant voltage is reduced to zero.

The computer 203 may be in the form of an analogue computer which develops voltages of, for example, a predetermined flight course, a map of the terrain over which the aircraft flies or other conditions.

The matrix 203 may be in the form of a printed wire mesh in which the wires match the mesh on the detector matrix 202 and with corresponding wires of the two meshes being interconnected by electronic switching means for comparing the voltages on such corresponding wires and developing, from such comparison, the control voltage applied to mechanism 204. Thus when the voltage pattern developed on the matrix 201 differs from the voltage pattern on matrix 203, a control voltage is developed for effecting operation of the system 205.

It is understood that while FIGURES 5–12 are described above essentially as mechanically operated systems, the same are made automatic by changing the screens therein to a detector matrix 201 and by incorporating such matrix 201 in an automatic control system as in FIGURE 15.

It is understood that the radiation source 200 may be the light from the sky which is itself polarized. It is filtered through a Nicol prism incorporated in the radiation source 200. It thus acts as a guidance element, if so desired, because the electric vector of sky light, even at night, is at right angles to a plane passing through the center of the universe, the sun and the beholder. A possibly changing polarization can be filtered out by appropriate means and followed on a predetermined course, if required, or used as a reference.

Other uses for the matrix of FIGURE 1 suggest themselves. For example, the same may be used for "map matching." In such case the voltage pattern developed on the matrix as the result of radiation from a particular locality may be compared with a predetermined voltage pattern on a second matrix representative of such locality. When these two voltage patterns coincide a circuit may be energized for effecting a control operation to, for example, drop a bomb.

Further the matrix can be used as a detector of the infrared radiation from hot missiles and airplanes or to photograph towns and transmit, if required, position information of several detected objects simultaneously and control aiming and firing and evasive actions and proximity fuses.

Also it is apparent that the matrix of FIGURE 1 may be used as a battery since it develops a voltage in response to radiation.

Further the same may be used as a generator of high frequency signals by scanning the terminal strips or a line of crystals to accomplish a voltage variation of the type shown in FIGURE 4, 31A, or register the dipole of each crystal in sequence or parallel. To accomplish the voltage variation the cell will be so illuminated or excited that every alternate semi-conductor is dark, and scanning as described above results in a varying voltage, the frequency of which depends also on the rate of scanning. By making the crystal spacing close and the scanning rate high, a high frequency variation is produced. As the frequency (wavelength) depends on the amount of semiconductors darkened and on their spacing, a series of superimposable matrices with various blacking out patterns can make a flexible generator for any desired frequency (Wavelength). Also the matrix of FIGURE 1 may be used as a light or radiation amplifier or converter in which the voltage developed is used to produce radiation which is either more intense or used to produce radiation which differs in frequency from the original incoming radiation.

Further a matrix of this character may be made quite sensitive so that the warmth of a person's hand close to the matrix may develop a voltage pattern used for different purposes, for example facsimile transmission of handwriting.

The matrix may also be used as an element of an oscilloscope as illustrated in FIGURE 16. Oscillations which are to be recorded are applied to a column of gas or liquid 275 subjected to an electromagnetic beam or atomic radiation. The beam 276 from source 277 is diffracted by the agitation set up in this liquid which can be ionized and the various diffraction fringes are spaced in direct relationship to the wavelength. If the temperature and surrounding conditions remain the same, the fringes will remain in the same spot so that writing need not be too rapid. Every transient, however, in the input signal applied to the end of the column of liquid will change the diffraction pattern on matrix 278 which in turn changes the voltage pattern of the matrix. Such change in voltage is used to trigger a paper-moving mechanism 279 such that the recording paper 280 travels faster in response to a transient condition.

The matrix, according to the photographic and printing-out system described in the copending application, records the diffraction pattern or transmits it, as described above, as soon as it appears on the face of the matrix. The oscillograph using a diffraction pattern can also function without the matrix; in this case the diffraction fringes are photographed by known recording means or, in case of invisible radiation by recording tape, Geiger counter and other known means. The write-out returns to normal speed as soon as the diffraction pattern returns to normal. The matrix can transmit the oscilloscope pattern in telemetering devices.

Thus every transient will be recorded immediately with a higher writing speed. This system saves much space and paper is saved.

The matrix can also serve as a detector for atomic particles or radiation. In the case of radiation an ionized gas is used in column 275. If atomic particles are to be detected, they are made to enter the column and the matrix is disposed opposite the entrance or all around the inside of the tube, thus registering and, if required, transmitting area disposition and detection. The matrix can then also transmit area disposition of the atomic particles or radiation. The matrix would be placed opposite the entry of particles. For radiation the source position and matrix remain the same as in FIGURE 16.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A mosaic comprising, spaced needle magnets and semi-conductor crystals, and a grid network of wires containing a first series and a second series insulated from each other and contacting corresponding series of said crystals.

2. A mosaic comprising, crystals arranged in rows and columns, a first series of conductors insulated from each other and contacting different crystals in different rows, and a second series of conductors insulated from each other and contacting crystals in different columns.

3. A photosensitive mosaic comprising, a plurality of crystals arranged in different rows and columns and each developing an electrical characteristic in response to radiation, and a grid of conductors insulated from each other with different conductors contacting crystals in different rows and columns.

4. A photoresponsive mosaic comprising, a radiation transparent base, insulated elements on said base responsive to radiation and developing an electrical characteristic in response to radiation transmitted through said base onto said elements, and a series of conductors associated with said elements and having said electrical characteristic transferred thereto.

5. In a system of the character described, a radiation transparent base, a plurality of photoresponsive elements mounted on said base and developing an electrical characteristic in response to radiation transmitted thereon through said base, means insulatingly mounting said elements on said base, with said elements being arranged on said base in rows and columns, a first series of conductors insulated from each other and each associated with different rows of said elements to transfer said electrical characteristic thereto, a second series of conductors insulated from each other and each associated with different ones of said elements in different columns to transfer said electrical characteristic thereto, first means scanning said first series of conductors for determining the electrical characteristic on different conductors in said first series, second means scanning said second series of conductors for determining the electrical characteristic of said conductors in said second series, means synchronizing the operation of said first and second scanning means and means coupled to said first and second scanning means for developing information relative to the electrical characteristic on each of said elements.

6. A mosaic as set forth in claim 2 in which adjacent conductors of a particular series have unequal spacing.

7. A system as set forth in claim 5 in which adjacent conductors of a particular series of conductors are unequally spaced.

8. A mosaic comprising, a radiation transparent base, a conductive coating on said base, insulated elements on said base responsive to radiation transmitted through said base and said conductive coating and developing an electrical pattern in response to radiation transmitted through said base and said coating onto said elements, and a series of conductors associated with said elements and having said electrical characteristic transferred thereto.

9. A system as set forth in claim 5 in which said second scanning means is inoperative during function of the first scanning means.

10. A high frequency generator comprising, a matrix having a plurality of insulated photosensitive elements for developing a voltage pattern representative of the radiation impinging thereon, a series of equally spaced conductors deriving a voltage from a corresponding one of said elements and means scanning said conductors to develop a high frequency voltage.

References Cited by the Examiner
UNITED STATES PATENTS

| | | | |
|---|---|---|---|
| 2,158,405 | 5/1939 | Coanda | 250—1 |
| 2,412,822 | 12/1946 | Malter | 250—41.5 |
| 2,813,983 | 11/1957 | Hammar | 250—220 |

OTHER REFERENCES

Air Navigation, G.P.O., 1955, pp. 580–586.

Nature, 1957, vol. 179, page 146. (Jan. 19, 1957, issue.)

Photoconductivity Conference, 1956, John Wiley & Sons, Inc., pages 307–309.

BENJAMIN A. BORCHELT, *Primary Examiner.*

NORMAN H. EVANS, CHESTER L. JUSTUS, SAMUEL FEINBERG, *Examiners.*

D. G. REDINBAUGH, A. E. HALL, R. M. SKOLNIK,
*Assistant Examiners.*